United States Patent [19]

Hogarth

[11] Patent Number: 4,466,166

[45] Date of Patent: Aug. 21, 1984

[54] GRIP MOUNTING ASSEMBLY

[76] Inventor: Harold W. Hogarth, 5950 Clara, Bell Gardens, Calif. 90201

[21] Appl. No.: 266,202

[22] Filed: May 22, 1981

[51] Int. Cl.[3] .................... B23P 19/02

[52] U.S. Cl. .................... 29/235; 29/450; 273/75

[58] Field of Search .................... 29/235, 450; 273/75, 273/67 DB

[56] References Cited

U.S. PATENT DOCUMENTS

| | | | |
|---|---|---|---|
| 2,877,070 | 3/1959 | Lee | 29/235 X |
| 3,073,016 | 1/1963 | Drake | 29/235 |
| 3,369,286 | 2/1968 | Marshall | 29/235 |
| 3,833,992 | 9/1974 | Moulin | 29/235 |
| 3,900,941 | 8/1975 | Browning et al. | 29/235 X |
| 4,185,375 | 1/1980 | Brown | 29/235 X |
| 4,291,451 | 9/1981 | O'Neill et al. | 29/235 |

FOREIGN PATENT DOCUMENTS

| | | | |
|---|---|---|---|
| 1239168 | 7/1960 | France | 29/235 |

*Primary Examiner*—Charlie T. Moon

*Attorney, Agent, or Firm*—William C. Babcock

[57] ABSTRACT

A Mandrel and method of using the same to form an elongate rigid guide that has a first elongate portion over which an elastomeric tube may be slid. A second elongate end portion of the guide when axially aligned with the handle of a tennis or racquet ball racquet may be caused to removably engage the same. Anti friction means are provided on the guide to facilitate the longitudinal movement of the elastomeric tube thereon. The handle of the racquet has a transverse cross sectional area substantially greater than that of the interior of the elastomeric tube. After the guide is in engagement with the handle, the elastomeric tube is moved towards the latter. Prior to the elastomeric tube moving onto the handle it is radially expanded to conform to the exterior configuration of the handle. After the tube is mounted on the handle the guide is separated from the handle, with the tube frictionally engaging the tube to define a grip thereon due to the tube being circumferentially stressed.

2 Claims, 7 Drawing Figures

FIG. 1
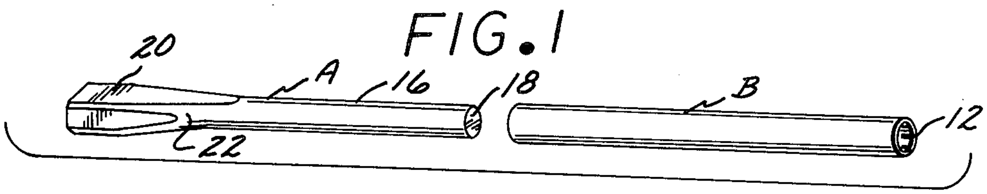
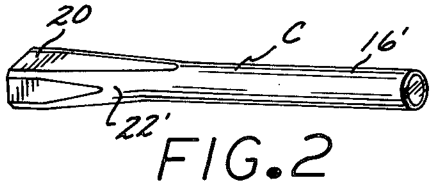
FIG. 2
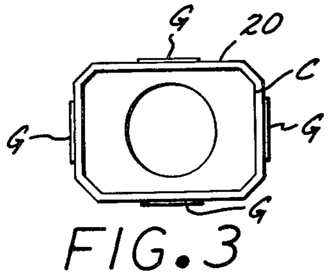
FIG. 3
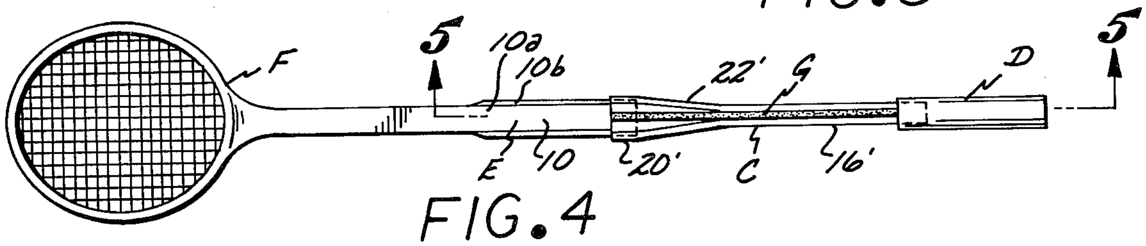
FIG. 4
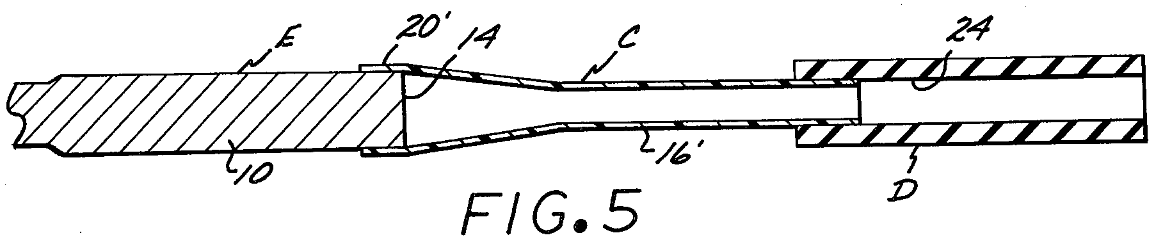
FIG. 5
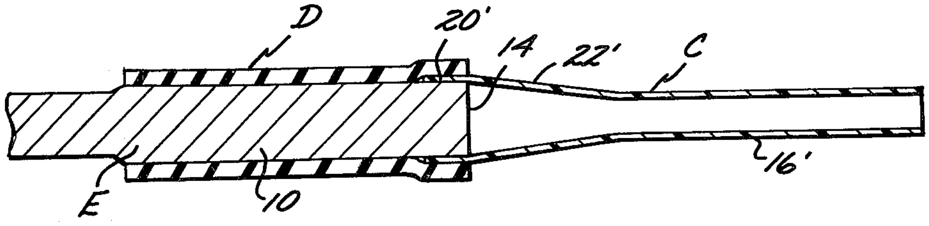
FIG. 6
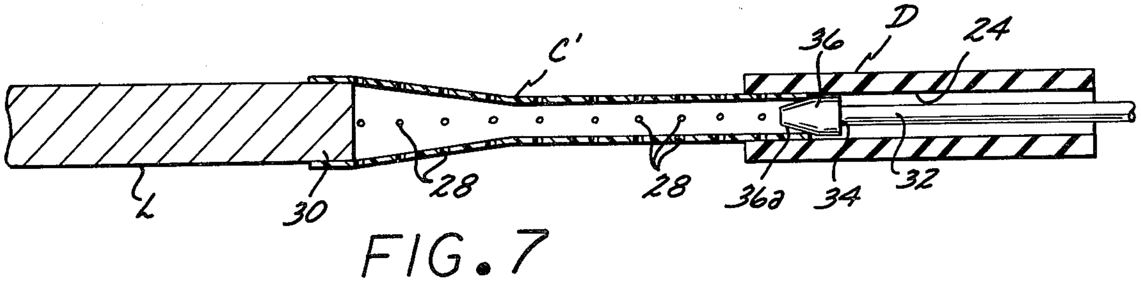
FIG. 7

GRIP MOUNTING ASSEMBLY

BACKGROUND OF THE INVENTION

1. Field of the Invention

Grip Mounting Device and Method of Forming and Using the same.

2. Description of the Prior Art

Tennis and racquet ball racquets commonly have an anti-slip covering enveloping the handles thereof. After prolonged usage such covering, particularly tape wound in a spiral configuration, tend to deteriorate due to perspiration from the hand of the player to the extent that they separate from the handles.

Recently centerless ground rubber tubes have become available, that are sold under the tradename Permalite, that are substantially impervious to the deteriorating action of perspiration. However, such tubes to serve as grips for tennis or racquet ball handles must have an interior transverse cross section substantially less than that of racquet handles on which they are to be mounted. The handles are of substantially square transverse cross section with beveled edges.

Due to the differential in areas of the transverse cross section of the handles and the interior of the rubber tubes, as well as the difference in the cross sectional configuration of the exterior surface of the handles and the interior of the non-stressed rubber tubes, it is extremely difficult to mount one of the rubber tubes on a racquet handle to define a grip thereon.

A major object of the present invention is to provide an elongate guide that removably grips a free end of a tennis or racquet ball handle, and permits a tube of an elastomeric material to be moved longitudinally thereon to subsequently envelop the handle and provide a grip thereon.

Another object of the invention is to provide an elongate mandrel and method of using the same to provide the guide that is subsequently employed for the object above defined.

A further object of the invention is to supply a guide that may be used to mount an elastomeric tube on any elongate object desired, such as the rearward end portion of an elongate flash light, bicycle grip or the like.

These and other objects of the invention will become apparent from the following description of the invention.

BRIEF DESCRIPTION OF THE DRAWINGS

FIG. 1 is a perspective view of the mandrel and a tube of heat softenable plastic that is used in forming the guide;

FIG. 2 is a perspective view of the guide after the same has been formed and longitudinally slid from the mandrel;

FIG. 3 is an end view of the guide after circumferentially spaced, longitudinally extending strips of an anti-friction tape have been mounted thereon;

FIG. 4 is a plan view of a handle of a tennis or racquet ball handle that is removably engaged by the guide, and a sleeve of elastomeric material that is to define the grip in engagement with the guide;

FIG. 5 is a longitudinal cross sectional view of the handle, guide and sleeve taken on the line 5—5 of FIG. 4;

FIG. 6 is the same view as shown in FIG. 4 but after the sleeve is mounted on the handle, but prior to the guide being disengaged from the sleeve; and FIG. 7 is a longitudinal cross sectional view of an alternate form of guide for mounting a tube of elastomeric material on an elongate rigid member.

DESCRIPTION OF THE PREFERRED EMBODIMENTS

In FIG. 1 an elongate rigid mandrel A is shown that is adapted to have a tube B of a heated polymerized resin such as PVC longitudinally slid thereover to transform the tube into the guide C shown in FIG. 2. A tennis or racquet ball racquet F that has a handle E may have a tube D of elastomeric material mounted thereon by use of the guide C to define a grip D'.

The handle E of both tennis and racquet ball racquets F has a gripable portion 10 that is of substantially square transverse cross section, and is conventionally defined by four longitudinal flat surfaces **10*a* and flat angled corner edge surfaces 10*b*. The tube D of elastomeric material when not stressed circumferentially has an internal cross sectional area 12 that is less than the transverse cross sectional area 14** of the handle E, and as previously mentioned the exterior surface of the handle and the interior surface of tube D are of different shapes when the tube is not stressed circumferentially.

The mandrel A is formed from a metal such as steel and includes a first longitudinal portion 16 that has a circular transverse cross sectional area 18 that is substantially less than the interior transverse cross sectional area 12 of elastomeric tube B.

Mandrel A also includes a longitudinal end portion 20 of substantially the same shape but of slightly larger transverse cross sectional area than that of the gripable portion **10*a* of handle E. The longitudinal end portion 20 merges into the longitudinal portion 16 by a smooth transition portion 22** situated therebetween as shown in FIG. 1.

When mandrel A and tube B are heated to the extent that the resin defining the tube softens, the tube may be moved longitudinally on the mandrel and in so doing acquiring the shape of the mandrel to provide the guide C shown in FIG. 2.

After the guide C has cooled to the extent that the resin defining the same is rigid, the guide is slid longitudinally from the mandrel. The guide C includes portions 16', 20' and 22' that correspond in shape to portions 16, 20 and 22 of mandrel A. The external diameter of the portion 16' of guide C is such that it may be inserted into the interior of elastomeric tube D. The portion 20' of guide C has such an interior transverse cross sectional area that the portion 20' may be slipped longitudinally onto the gripable portion 10' of handle E as shown in FIG. 5.

The guide C has a number of strips G of tape attached in longitudinally extending positions thereon as shown in FIG. 4. Each strip G has a pressure sensitive adhesive on both sides thereof. When the exposed adhesive on a strip G is wet with a suitable liquid such as paint thinner, naptha or mineral spirits the adhesive becomes slippery. A suitable tape for this purpose is 3M, Model 410.

To mount the tube D on the gripable portion of the handle E, the guide C is disposed in engaging contact with the handle as shown in FIG. 5. Tube D is now slid longitudinally on guide C, with this movement being eased due to the interior surface 24 of the tube sliding on the slippery surfaces of the tapes G. As such longitudinal movement of the tube D takes place it is sequentially deformed to the external configuration of the gripable portion 10 of handle C as shown in FIG. 6. Longitudinal movement of the tube D over the gripable portion 10 of handle E is facilitated by a portion of the slippery adhesive rubbing off from the strips G onto the internal surface 24 serves as a lubricant in moving the tube D on handle E. After the tube D is fully mounted on the handle E as shown in FIG. 6, the guide C is removed. Tube D is not only circumferentially deformed to define grip D′, but is also circumferentially tensioned to remain in a frictional gripping position on the handle E. The PVC used in forming the guide C is preferably of the Class 200, which is a well known designation in the trade as in Permalite for the centerless ground rubber tube D.

An alternate form of the invention is shown in FIG. 7 in which a guide C′ is provided that is the same as the guide C, with the exception that the strips G are omitted therefrom, and in their place a number of longitudinally spaced ports 28 are formed in the guide. The guide C′ may be caused to snuggly engage an end portion 30 of an elongate object L that may be a handle of a racquet, end portion of a flash light, bicycle grip, or the like.

A rigid conduit 32 is provided that is connected to a source of pressurized air (not shown). The conduit 32 on a free end 34 thereof supports a nozzle 36 that has a tapered external surface **36*a* that removably and sealingly engages the guide C′. When air under pressure is directed into the guide C′ through nozzle 36 it flows outwardly through the ports 28, and radially expands the interior surface 24** of elastomeric tube D to the extent it may be slid longitudinally over the guide C′ onto the elongate member L to envelop the latter.

The air under pressure must be delivered to the guide C′ in sufficient volume that air discharges concurrently through all the ports 28 irrespective of whether or not they are covered by the tube D. Tube D after mounting an elongate member L by use of the alternate form of the invention shown in FIG. 7, transforms to a grip D′ or protective cover as illustrated in FIG. 6.

The use and operation of the invention has been explained in detail and need not be repeated.

What is claimed is:

1. In combination with a racquet that has a handle of substantially square transverse cross section and an elongate elastomeric tube that has an interior transverse cross section less than that of said handle, a portable assembly for mounting said tube on said handle to define a grip, said portable assembly including:

a. a hollow elongate rigid guide that includes a first end portion of circular transverse cross section of such dimensions that said tube may be slideably mounted thereon, a second hollow end portion that removably telescopes over and engages an end extremity of said handle, said second end portion having a transverse cross section of the same shape as that of said handle and larger in cross-sectional area than said first end, and an intermediate portion increasing in cross-sectional area between said first and second end portions to provide a transition portion therebetween; and b. anti-friction means that comprising parallel laterally spaced strips that extend along the longitudinal length of the rigid guide and covers at least a portion of the exterior surface of said guide that permit said tube to be moved and expanded longitudinally along said guide from said first end portion of said second end portion and onto said handle to define a grip, with said guide being removable from said handle after said tube is positioned thereon for subsequent use in mounting elastomeric tubes on other racquet handles.

2. A portable assembly as defined in claim 1 in which said parallel laterally spaced strips includes a pressure sensitive adhesive on both sides thereof, and a liquid that renders said pressure sensitive on the exterior sides of said strips slippery to facilitate the longitudinal movement of said tube thereover to said handle.

* * * * *